United States Patent Office 3,780,058
Patented Dec. 18, 1973

3,780,058
2-PYRAZOLINE-1-CARBOXAMIDE SULFONAMIDE DERIVATIVES
Zdzislaw Brzozowski, 9 m 1 Sniadeckich St.; and Stefan Angielski, 10 m 1 Hoene-Wronskiego St., both of Gdansk-Wrzeszcz, Poland; and Czeslaw Wojcikowski, 86 c m 95 Pomorska St., Gdansk-Oliwa, Poland
Filed Sept. 16, 1971, Ser. No. 181,009
Claims priority, application Poland, Sept. 19, 1970, P 143,319
Int. Cl. C07d 49/10
U.S. Cl. 260—310 D                                2 Claims

ABSTRACT OF THE DISCLOSURE 2-pyrazoline - 1 - carboxamide sulfonamide derivatives having the general formula:

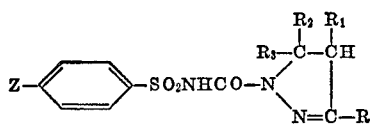

in which Z is hydrogen, halogen or lower alkyl, and R, $R_1$, $R_2$, $R_3$ are each hydrogen or lower alkyl. These sulfonamide compounds have a hypoglycemic effect and are obtained by reacting a 2-pyrazoline derivative such as $HN-CR^2R^3-CHR^1-CR=N$ with an arylsulfonylurea such as $Z-C_6H_4SO_2NHCONH_2$ or with an arylsulfonylisocyanate such as $Z-C_6H_4SO_2NCO$ or by the thermal decomposition of the molecular combination of the 2-pyrazoline derivative and the arylsulfonylurea.

DRAWING

Figure 3:
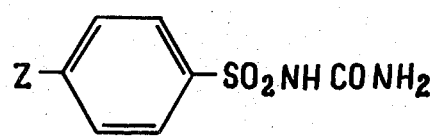
Figure 5:
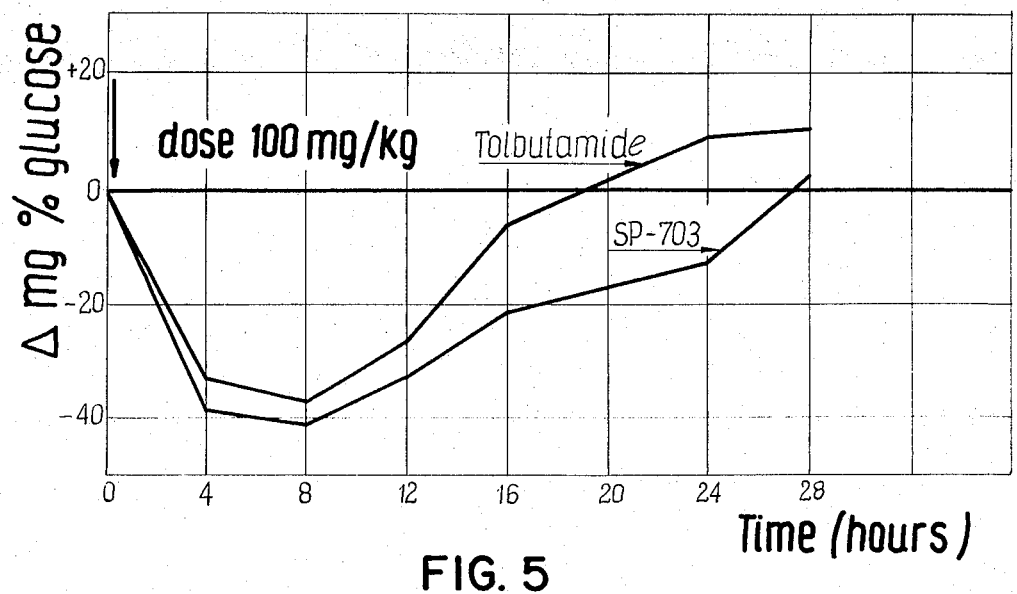
Figure 6:
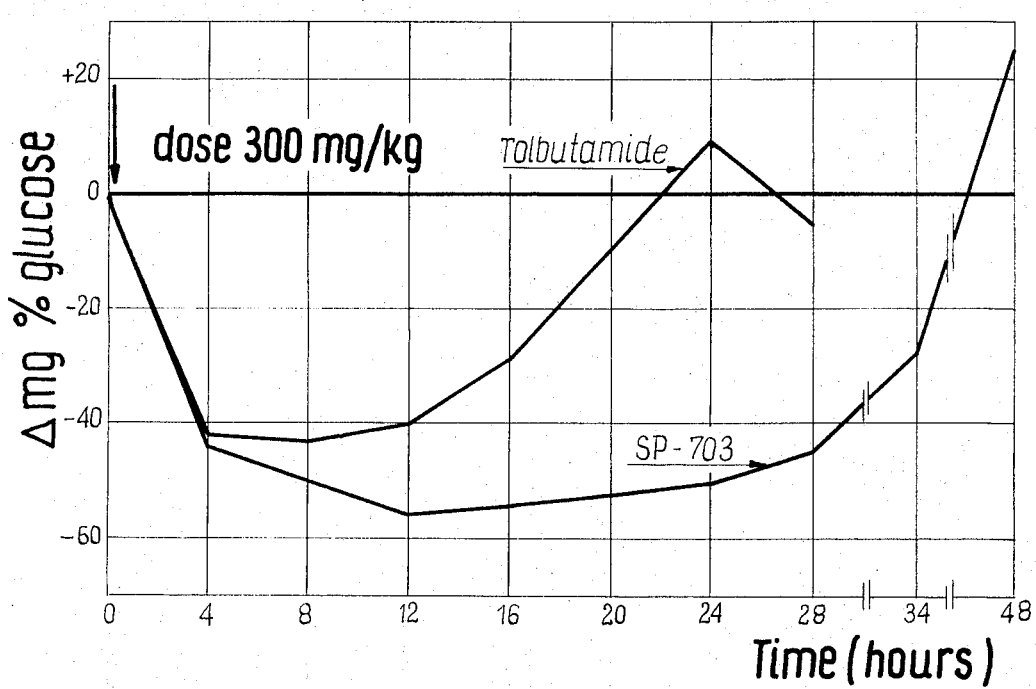
Figure 7:
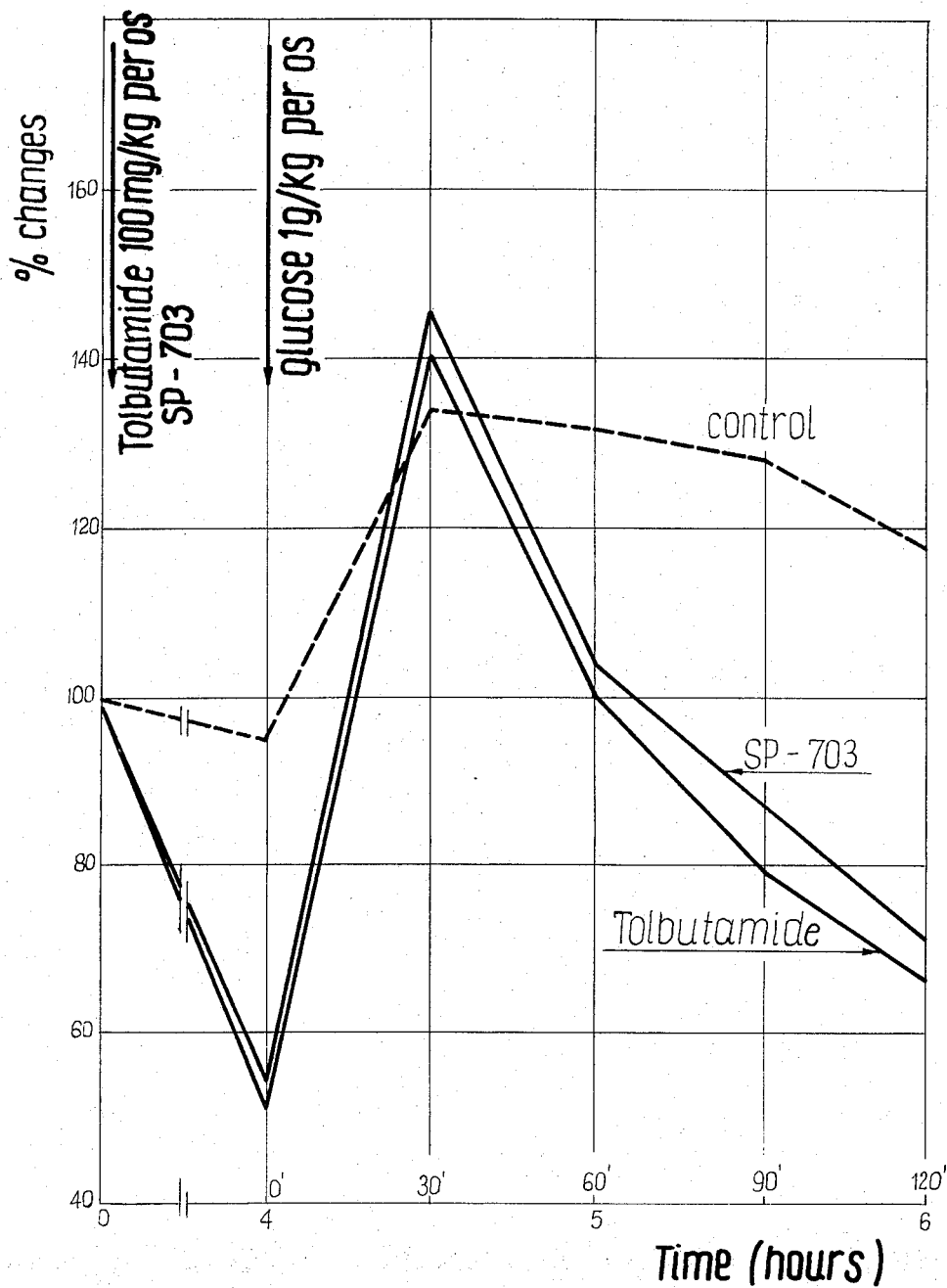

In the appended drawing:
FIGS. 1-4 illustrate the structures of compounds relevant to the present invention; and
FIGS. 5-7 are graphs showing the hypoglycemic action of compounds according to the invention in comparison with existing compounds.

with N-arylsulfonylurea of the general formula as given in FIG. 3, in the appended drawing, in which Z is of the meaning mentioned above, at a temperature of 80–130° C., in an anhydrous solvent, whose dielectric constant at a temperature of 20° C. is less than 10 and whose boiling point is higher than 80° C. Such solvents are dioxane, chlorobenzene etc. The compounds of the invention can also be obtained by heating the salts of such 2-pyrazoline derivatives such as the salts of sulfuric acid etc.

It is also possible to obtain the compounds if the molecular combination of a suitable 2-pyrazoline derivative with N-arylsulfonylurea is subjected to thermal decomposition. Such combinations separate in the form of sparingly soluble deposits during mixing of molar amounts of the components in the presence of a solvent having a low dielectric constant, such as, for instance, dioxane, at a temperature of 20–80° C.

Figure 4:
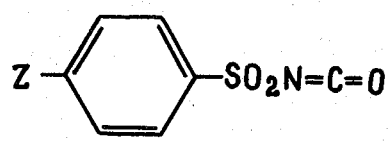

It has been found that the N-arylsulfonylureas may be replaced by N-arylsulfonylisocyanates of the general formula as given in FIG. 4 in the appended drawing, in which Z is of the meaning stated above, if the reaction with appropriate 2-pyrazoline derivatives is conducted in inert solvents or in solvents with which the N-arylsulfonylisocyanates form similarly reacting derivatives, such as, for instance, benzene, chlorobenzene, etc., initially at a temperature of up to 20° C. and then at a temperature of up to 80° C.

The compounds obtained according to said methods, are separated from the reaction mixture by dissolving them in aqueous hydroxide solutions, by extraction or by dissolving the remainder after distilling of the solvent under reduced pressure, by separating the reaction by-products sparingly soluble in the alkaline medium, and by further precipitating them at slow neutralization or acidification of the solution diluted in a ratio of above 1:30 in relation to the mass of the product.

The compounds of the invention represent a new group of sulfonamides having a strong hypoglycemic action and for this reason they can be used for the reduction of the glucose level in the blood. Some examples of their influence on the glucose level in the blood of rats, depending on the action time of the orally administered 100 mg./kg. body weight dose are given in Table I.

TABLE I

| Consecutive No. | No. of the example | Z | R | $R_1$ | $R_2$ | $R_3$ | Percent of decrease (−) or increase (+) of the sugar concentration in the blood of rats (dose=100 mg./1 kg. of weight of the rat), hours of measurement— | | | | |
|---|---|---|---|---|---|---|---|---|---|---|---|
| | | | | | | | 4 | 8 | 12 | 16 | 24 |
| 1 | 12 | H | $CH_3$ | H | H | H | −36 | −36 | −35 | −22 | −25 |
| 2 | 13 | H | H | H | H | $CH_3$ | −10 | −12 | −13 | −13 | +13 |
| 3 | 18 | H | H | $C_2H_5$ | H | $n-C_3H_7$ | 0 | | | | |
| 4 | 14,15,16,17 | H | $CH_3$ | H | $CH_3$ | $CH_3$ | −3 | | | | |
| 5 | 1,2,3 | $CH_3$ | H | H | H | H | −10 | +1 | +2 | +11 | +15 |
| 6 | 9 | $CH_3$ | $CH_3$ | H | H | H | −23 | −17 | −27 | −10 | −7 |
| 7 | 4,6,7,8 | $CH_3$ | H | H | H | $CH_3$ | −41 | −45 | −41 | −27 | −16 |
| 8 | 11 | $CH_3$ | H | $C_2H_5$ | H | $n-C_3H_7$ | −14 | −23 | −18 | −9 | +3 |
| 9 | 10 | $CH_3$ | $CH_3$ | H | $CH_3$ | $CH_3$ | −26 | −34 | −26 | −17 | +1 |
| 10 | 19 | Cl | H | H | H | H | −16 | | | | |
| 11 | 20,21 | Cl | H | H | H | $CH_3$ | −33 | −39 | −25 | −10 | 0 |
| 12 | 23 | Cl | H | $C_2H_5$ | H | $n-C_3H_7$ | −11 | | | | |
| 13 | 22 | Cl | $CH_3$ | H | $CH_3$ | $CH_3$ | −10 | | | | |

SUMMARY OF THE INVENTION

Figure 1:
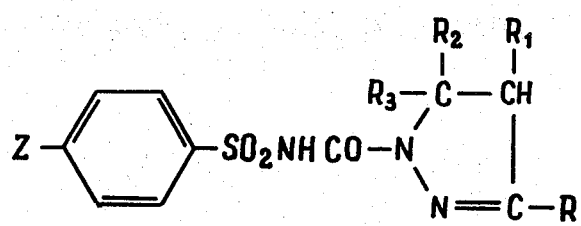

The present invention relates to novel 2-pyrazoline-1-carboxamide sulfonamide derivatives having the general formula as given in FIG. 1, in the appended drawing, in which Z is hydrogen, a halogen or a lower alkyl group, and R, $R_1$, $R_2$ and $R_3$ are hydrogen or a lower alkyl group.

Figure 2:
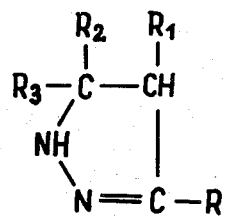

Compounds according to the invention are obtained by heating appropriate 2-pyrazoline derivatives of the general formula as given in FIG. 2 in the appended drawing, in which R, $R_1$, $R_2$, $R_3$ have the above-mentioned meaning Such properties are revealed especially by 5-methyl-N-(p-tolylsulfonyl)-2-pyrazoline - 1 - carboxamide (hereinafter called SP-703), the hypoglycemic action of which has been thoroughly examined on mice, rats and rabbits. This action was compared with the hypoglycemic action of N-p-tolylsulfonyl-N-n-butylurea (Tolbutamide) and are shown in FIGS. 5 and 6.

It has been found that the action of the SP-703 preparation reducing the glucose concentration in the blood, is more protracted than the similar action of Tolbutamide.

When administering the SP-703 preparation and Tolbutamide to rats in a dose of 100 mg./kg. of body weight, it is observed that the maximum hypoglycemic action of the two preparations occurs between the 4th and 8 hour from the time of administration. However, the SP-703 preparation action is still evident 24 hours after its introgastric administration. This difference is still more evident with a dose of 300 mg./kg. body weight where after 34 hours from the administration of the SP-703 preparation, a substantial hypoglycemia is observed, whereas in the case of Tolbutamide this action is maintained for about 20 hours only.

The influence of the SP-703 preparation dose on the sugar level in the blood has been examined and it was found that a maximum reduction of the sugar level in the blood is obtained after a dose of 400 mg./kg. body weight. A further increase in the dose of the preparation administered does not further lower the sugar level in the blood which reaches about 40% of the value before administration.

The toxic dose $LD_{50}$ for mice after 24 hours from administration of the SP-703, given intragastrically, is 920 mg./kg., while for rats it exceeds 6 g./kg. When examining the toxicity during 7 days, it was found that females are more sensitive to the action of said preparation, and so the $LD_{50}$ does for rat females was 620 mg./kg., while for males it was 1500 mg./kg.

The gathered data is given in Table II.

control group was 24% and that of the group receiving 100 mg. and 300 mg./kg. was about 20%.

For a better recognition of the operation mechanism of the SP-703 preparation, examinations on rats afflicted with heavy alloxan diabetes have been made, but no influence of said preparation thereon has been found, nor was any influence found of Tolbutamide on the sugar level in the blood. An oral glucose tolerance test has also been performed and is illustrated in Diagram 3, which shows a similar course of the SP-703 preparation as compared to that for Tolbutamide.

This data indicates that the SP-703 preparation and Tolbutamide act through stimulation of insulin secretion, but it does not exclude the possibility that the SP-703 preparation acts upon the gluconeogenesis or glucogenolysis process.

To resolve this, examination on underfed rats (containing no glycogen in the liver) have been made. The administration of glucose, fructose and glycerol to such rats provides an increase of glycemia which becomes distinctly decreased after the administration of the SP-703 preparation, whereas the obtained increase of glycogen in the liver remains without any change in spite of the administration of said preparation. No influence of the SP-703 preparation on the glycogen level in the muscles of well-fed and underfed rats has been observed.

This indicates the action of the SP-703 preparation through insulin. This is confirmed in tests in which the

TABLE II

Influence of SP-703 on some morphologic and biochemical parameters in the blood of rats (7th day of administration)

| Kind of investigations | | Mortality, percent | Glucose, mg. percent | GPT, J | GOT, J | Amylase, Ja/100 ml. | Ht, percent | Hb, g. percent | Erythr., thousand/mm.³ | Leukocyt., 1/mm.³ |
|---|---|---|---|---|---|---|---|---|---|---|
| Dose of the compound: | | | | | | | | | | |
| 1.0 gram | ♂ | 0 | 53±10 | 9±5 | 38±5 | 1,070±330 | 40±4 | 14.7±1.8 | 4,050±500 | 9,300±1,300 |
| 1.0 gram | ♀ | 70 | 79±19 | 7±4 | 42±11 | 1,230±160 | 36±1 | 12.3±1.2 | 4,030±320 | 5,300±1,900 |
| 0.3 gram | ♂ | 0 | 46±10 | 10±2 | 35±9 | 1,510±270 | 41±2 | 13.8±0.9 | 4,130±330 | 8,500±2,300 |
| 0.3 gram | ♀ | 10 | 92±14 | 9±2 | 30±12 | 1,510±220 | 39±3 | 13.2±1.2 | 4,000±500 | 8,600±2,800 |
| Control | ♂ | 0 | 75±7 | 27±10 | 36±9 | 1,760±310 | 48±2 | 14.7±1.1 | 4,450±230 | 9,400±1,500 |
| Do | ♀ | 0 | 97±10 | 14±4 | 30±3 | 1,420±250 | 42±4 | 12.8±0.7 | 4,250±320 | 10,300±1,000 |

Protracted toxicity examinations have been performed over a 10 month period on mice, rats and rabbits, during which time the preparation under examination was given in the food in two doses of 100 mg./ and 300 mg./kg. body weight.

The average weight of the mice during the examination of protracted toxicity of the SP-703 preparation is given in Table III below.

TABLE III

| | Males | | | Females | | |
|---|---|---|---|---|---|---|
| Months | Control | 0.1 g./kg. | 0.3 g./kg. | Control | 0.1 g./kg. | 0.3 g./kg. |
| 0 | 38 | 38 | 36 | 34 | 34 | 29 |
| 1 | 37 | 38 | 35 | 32 | 31 | 29 |
| 2 | 38 | 39 | 36 | 33 | 32 | 30 |
| 3 | 42 | 40 | 40 | 36 | 34 | 32 |
| 4 | 40 | 41 | 40 | 35 | 34 | 30 |
| 5 | 43 | 41 | 38 | 33 | 33 | 31 |
| 6 | 40 | 40 | 36 | 33 | 33 | 31 |
| 7 | 41 | 40 | 38 | 33 | 33 | 30 |
| 8 | 40 | 39 | 37 | 32 | 32 | 31 |
| 9 | 41 | 28 | 38 | 32 | 32 | 31 |

No weight differences between the groups under examination and the control group, as well as in the consumption of food and water have been observed.

Post mortem and histopathological examinations of the kidneys, liver, spleen, lungs and heart do not shown any changes in the two groups being examined. Biochemical examinations of the blood: diastase, aminotranspherase, GOT and GTP, haemoglobin, number of red blood corpuscles and also haemacrit, do not reveal differences between the control group and the groups under examination.

No drop was observed in the number of white corpuscles in the circumferential blood of mice examined as to protracted toxicity. The mortality of mice in the content of free fatty acids has been determined and where it has been found that the SP-703 preparation distinctly decreases the level of free fatty acids in the plasma of rats being examined.

Furthermore, it has been observed that the SP-703 preparation does not exert an influence on the glycogen level in the liver of underfed rats, but it considerably decreases the level in the liver of well-fed rats, which indicates an action that is contrary to the action of insulin and presumes that the action of the SP-703 preparation is not connected with insulin.

DESCRIPTION OF PARTICULAR EMBODIMENTS

The method according to the invention is more fully disclosed with reference to the following examples.

Example I 51.4 g. N-p-tolylsulfonylurea and 17 g. of 2-pyrazoline in 500 ml. of dioxane are slowly heated to boiling and maintained thereat for 2 hours. Then, under decreased pressure at a temperature of up to 60° C. the dioxane is distilled off and the remainder is dissolved in 1000 ml. of 1% aqueous ammonia solution. The solution obtained is neutralized to a pH=7 by addition of hydrochloric acid, then it is decolorized with active carbon and after dilution with 5000 ml. of water, it is slowly acidified with 1% hydrochloric acid to pH=4. There are obtained 43 g. of N-(p-tolylsulfonyl)-2-pyrazoline-1-carboxamide. Its melting point is 164–165° C., and the yield 67.1%.

Example II

To a solution of 17 g. of 2-pyrazoline in 1000 ml. of chlorobenzene there is added dropwise at a temperature of 20° C., 11.8 g. of concentrated sulphuric acid, and then 51.4 g. of N-p-tolylsulfonylurea is added and the mixture is heated for 4 hours at a temperature of 105–110° C. After cooling, the reaction mixture is subjected to a triple extraction with a 2% aqueous ammonia solution, using each time 350 ml. of said solution. The subsequent procedure is according to Example I, and there is obtained 35 g. of N-(p-tolylsulfonyl)-2-pyrazoline-1-carboxamide. The melting point is 162.5–164.5° C. and the yield is 51%.

Example III

To a solution of 14. g. of 2-pyrazoline in 200 ml. of benzene, a solution of 39.4 g. of p-tolylsulfonyl-isocyanate in 200 ml. of benzene is added so that the temperature does not exceed 40° C., whereupon the mixture is heated for 1.5 hours at a temperature of 60° C. After cooling, the reaction mixture is subjected to a triple extraction by means of a 2% aqueous ammonia solution, using each time 300 ml. of said solution. The joined extracts are diluted with water to a volume of 3000 ml., then they are neutralized to a pH value of 7 by means of hydrochloric acid and decolorized with active carbon. After separation of the active carbon, 100 ml. of methyl alcohol are added to the filtrate and by slow acidification by addition of 1% hydrochloric acid to a pH value of 4 there is obtained 36.2 g. of N-(p-tolylsulfonyl)-2-pyrazoline-1-carboxamide. The melting point is 163–165° C.; the yield is 56.5%.

Example IV

To a suspension of 107 g. of N-p-tolylsulfonylurea in 700 ml. of dioxane, 43.6 g. of 5-methyl-2-pyrazoline are added, the mixture is stirred for 1 hour at room temperature and then the whole mixture is slowly heated to boiling and maintained thereat for 4 hours. From the clear solution thus obtained, the dioxane is distilled off under reduced pressure at a temperature of up to 55° C. and the syrupy remainder is dissolved in 450 ml. of a 3% aqueous ammonia solution previously heated to a temperature of 40° C. The solution obtained is diluted with 1500 ml. of water and at a temperature of 40° C. it is neutralized to a pH value of 7–7.5 by addition of a 0.5% hydrochloric acid solution. The solution is then decolorized by active carbon, and the reaction product is precipitated by acidification with hydrochloric acid to a pH value of 4.5, by the method stated below.

Into 1200 ml. of water, 5 g. of the product from the previous charge and 100 ml. of the above obtained solution of the product, are introduced. Then, while continuously stirring, the 0.5% hydrochloric solution and further amounts of the solution of the precipitated product are simultaneously very slowly introduced, the pH value of the mixture being maintained within the range of 5–6.

After the entire solution of the reaction product is added, the acidification is continued up to pH 4.5. There is obtained 128 g. of 5-methyl-N-(p-tolylsulfonyl-2-pyrazoline-1-carboxamide. The melting point is 118–120° C., and the yield is 91%.

Example V 160 g. of N-p-tolylsulfonylurea and 68 g. of 5-methyl-2-pyrazoline are successively introduced into 400 ml. of dioxane. The mixture is then stirred for 30 minutes at room temperature and subsequently slowly heated to a temperature of up to 75–78° C., the mixture being maintained at this temperature for 15 minutes. After cooling to a temperature of 0° C., stirring is continued for 3 hours, whereupon the precipitate is separated, and then dried at room temperature under reduced pressure. After heating the product at a temperature of 185° C. there is obtained 153 g. of a molecular combination of N-p-tolylsulfonylurea with 5-methyl-2-pyrazoline having a melting point of 190° C.

Example VI 149.2 g. of the combination of N-p-tolylsulfonylurea with 5-methyl-2-pyrazoline, obtained according to Example V is introduced into 700 ml. of dioxane and heated for 2 hours at boiling. After separation as described in Example IV, 131 g. of 5-methyl-N-(p-tolylsulfonyl)-2-pyrazoline-1-carboxamide are obtained. The melting point is 119–121° C., the yield 93%.

Example VII 96.4 g. of N-p-tolylsulfonylurea and 40 g. of 5-methyl-2-pyrazoline in 850 ml. of anhydrous toluene are stirred for 3 hours at room temperature, whereupon the mixture is maintained at boiling up to completion of ammonia separation which takes about 12–15 hours. After cooling, the mixture is subjected to a quadruple extraction by means of a 2% aqueous ammonia solution, using 200 ml. of said solution each time.

The joined extracts are decolorized with the aid of active carbon, whereupon they are diluted with 1000 ml. of water and then acidified by addition of 0.5% hydrochloric acid to a pH value of 7.5. After a repeated decolorization with active carbon, the reaction product is precipitated by acidification to pH 4.5 using the method in Example IV 115.9 g. of 5-methyl-N-(p-tolylsulfonyl)-2-pyrazoline-1-carboxamide are obtained. The melting point is 118–120° C., and the yield 91.5%.

Example VIII

To a solution of 19.7 g. of N-p-tolylsulfonylisocyanate in 150 ml. of benzene, is added a solution of 8.4 g. of 5-methyl-2-pyrazoline in 20 ml. of benzene so that the temperature does not exceed 30° C., whereupon the mixture is heated for 2 hours at a temperature of 60° C. After cooling, the mixture is subjected to a triple extraction with a 25% aqueous ammonia solution, using 100 ml. of said solution each time. The joined extracts are heated to a temperature of 40° C., whereupon they are neutralized to pH 7–7.5 by addition of 0.5% hydrochloric acid and then decolorized with active carbon. After the separation of active carbon, the filtrate is added in portions to 500 ml. of water containing a suspension of 2 g. of the product from the previous charge and simultaneously 0.5% hydrochloric acid is added dropwise so that the pH value is maintained within the range of 5–6. After the entire solution of the reaction product is added, acidification is continued up to a pH=4.5. 19.6 g. of 5-methyl-N-(p-tolylsulfonyl)-2-pyrazoline-1-carboxamide are obtained. The melting point is 118–120° C., and the yield is 69.7%.

Example IX 107.1 g. N-p-tolylsulfonylurea, 47 g. of 3-methyl-2-pyrazoline in 1000 ml. of dioxane are heated for 3.5 hours at the boiling temperature. The under reduced pressure at a temperature of 50° C., the dioxane is distilled off and the obtained crystal remainder is dissolved in 1800 ml. of a 1% aqueous ammonia solution previously heated to a temperature of 40° C. The obtained solution is decolorized with active carbon and after diluting with 600 ml. of water, the solution is carefully acidified with 0.5% hydrochloric acid to a pH value of 6.5–7. After stirring for about 10–20 minutes, a crystal deposit begins to be precipitated. Stirring is continued for 30 minutes, and then acidification is continued to a pH value of 4.5–5. 128 g. of 3-methyl-N-(p-tolylsulfonyl)-2-pyrazoline - 1 - carboxamide are obtained. The melting point is 188–190° C., and the yield is 91%.

Example X

To a suspension of 64 g. of N-p-tolylsulfonylurea in 500 ml. of dioxane there are 36 g. of 3,5,5-trimethyl-2-pyrazoline. The mixture is stirred for 30 minutes at room temperature and the whole mixture is then slowly heated to boiling temperature and maintained thereat for 2 hours. From the solution thus obtained, the dioxane is distilled off under reduced pressure at a temperature up to 50° C. and the remainder is dissolved in 900 ml. of 1% aqueous ammonia solution previously heated to a temperature of 40° C. The solution obtained is decolorized with active carbon, then diluted to a volume of 8000 ml. with water and after heating to a temperature of 30–32° C. the solution is acidified with 0.5% hydrochloric acid to pH 6. 74.1 g. of 3,5,5-trimethyl-N-(p-tolylsulfonyl)-2-pyrazoline-1-carboxamide is obtained. The melting point is 164–166° C. and the yield is 80%.

Example XI 107 g. of N-p-tolylsulfonylurea, and 70.1 g. of 4-ethyl-5-n-propyl-2-pyrazoline in 750 ml. of dioxane are heated for 4 hours at the boiling temperature. Then under reduced pressure at a temperature of up to 50° C. the dioxane is distilled off, 100 ml. of water is added and then successive distilling is performed to remove the unreacted 4-ethyl-5-n-propyl-2-pyrazoline.

The remainder is dissolved at a temperature of 40–50° C. in 1000 ml. of a 2.5% aqueous ammonia solution, then it is decolorized with active carbon, neutralized with hydrochloric acid to pH 8 and then decolorized again with active carbon. The colorless solution obtained is diluted with 6000 ml. of water and then acidified with 0.5% hydrochloric acid to a pH value of 6.

16 g. of 2-ethyl-5-n-propyl-N-(p-tolylsulfonyl)-2-pyrazoline-1-carboxamide are obtained. The melting point is 127–129° C. and the yield is 91%.

Example XII 100 g. of N-phenylsulfonylurea and 46 g. of 3-methyl-2-pyrazoline in 1000 ml. of dioxane are heated for 6 hours at the boiling temperature. After separation as described in Example IV, 119 g. 3-methyl-N-(p-phenylsulfonyl)-2-pyrazoline-1-carboxamide are obtained. The melting point is 145–147° C., and the yield is 89%.

Example XIII 100 g. of N-phenylsulfonylurea and 43 g. of 5-methyl-2-pyrazoline in 900 ml. of dioxane are slowly heated to boiling. In this period N-phenylsulfonylurea is being dissolved, and shortly thereafter its molecular connection with 5-methyl-2-pyrazoline takes place, which when further heated for 2.5 hours at boiling temperature, emits ammonia and is converted to 5-methyl-N-(phenylsulfonyl)-2-pyrazoline-1-carboxamide.

This compound is separated from the reaction mixture according to the method as described in Example IX, its precipitation from the ammonia solution being performed by acidification to pH 4. 52.8 g. of pure product are obtained. The melting point is 109–111° C. and the yield is 39.5%.

Example XIV

To a solution of 60 g. of N-phenylsulfonylurea in 700 ml. of dioxane, 38.5 g. of 3,5,5-trimethyl-2-pyrazoline are added and the mixture is heated to a temperature of 50° C. At this temperature the crystal parent substance adduct (1:1) is precipitated which when further heated at the boiling temperature separates ammonia and is converted to 3,5,5 - trimethyl-N-(phenylsulfonyl)-2-pyrazoline-1-carboxamide. After cooling, 55.8 g. of pure crystal product are obtained from the reaction mixture. The melting point is 208–211° C. and the yield is 63%.

Example XV

The reaction of 3,5,5-trimethyl-2-pyrazoline with N-phenylsulfonylurea is carried out according to Example XIV, whereupon the dioxane is distilled off under reduced pressure. The dry remainder is dissolved in 120 ml. of a 1% aqueous ammonia solution previously heated to a temperature of 30° C. The solution obtained is neutralized by means of hydrochloric acid to a pH=8, whereupon the solution is decolorized with active carbon and after dilution with water to a volume of 5000 ml., the solution is acidified with 0.5% hydrochloric acid to a pH value of 7. 69.4 g. of 3,5,5-trimethyl-N-(phenylsulfonyl)-2-pyrazoline-1-carboxamide are obtained. The melting point is 209–211° C. and the yield is 78.3%.

Example XVI 60 g. of N-phenylsulfonylurea and 40 g. of 3,5,5-trimethyl-2-pyrazoline in 1200 ml. of chlorobenzene are heated for 5 hours at a temperature of 110° C. Then, under reduced pressure the chlorobenzene is distilled off and from the remainder 56 g. of N-(benzenesulphonyl)-3,5,5-trimethyl-2-pyrazoline-1-carbonamide are obtained according to the method described in Example XIV. The melting point is 208–210° C. and the yield is 63.2%.

Example XVII

The method of Example XVI is effected with toluene instead of chlorobenzene, 61.4 g. of 3,5,5-trimethyl-N-(phenylsulfonyl)-2-pyrazoline - 1 - carboxamide are obtained. The melting point is 208–210° C. and the yield is 69.3%.

Example XVIII 70.5 g. of 4-ethyl-5-n-propyl-2-pyrazoline, and 100 g. of N-phenylsulfonylurea in 900 ml. of dioxane are heated to boiling. A combination is obtained at a temperature of 70–75° C., and upon further heating for 2.5 hours at the boiling temperature, this is converted to 4-ethyl-5-n-propyl-N-(p-phenylsulfonyl) - 2 - pyrazoline - 1 - carboxamide passing into the solution. From the reaction mixture the compound is isolated according to the method described in Example XI, its precipitation from the ammonium salt solution being performed by acidification to a pH value of 5.5. 152 g. of pure product are obtained. The melting point is 119–120° C. and the yield is 90.7%.

Example XIX

To 500 ml. of dioxane, 56.3 g. of N-p-chlorophenyl sulfonylurea and 17 g. of 2-pyrazoline are added, whereupon the reaction and the isolation of the product are carried out proceeding according to Example I, with the difference, however, that the precipitation of the product is performed with 0.5% hydrochloric acid to a pH value of 4.5. 51 g. of N-(p-chlorophenylsulfonyl)-2-pyrazoline-1-carboxamide are obtained. The melting point is 183–185° C., and the yield is 73.9%.

Example XX

To a solution of 13 g. of 5-methyl-2-pyrazoline in 400 ml. of dioxane and 100 ml. of toluene, 35 g. of N-p-chlorophenylsulfonylurea are added. The mixture is stirred for 2 hours at room temperature, whereupon the mixture is boiled and maintained at boiling up to completion of the ammonia separation, which takes about 1.5–2 hours. From the reaction mixture thus obtained, the solvents are distilled off under reduced pressure (10–20 mm. Hg) while the remainder is dissolved in 300 ml. of a 2% aqueous ammonia solution.

The solution obtained is diluted with 1800 ml. of water, neutralized with 0.5% hydrochloric acid to a pH value of 7–7.5, decolorized with active carbon and then the reaction product is precipitated by acidification with hydrochloric acid to a pH value of 4.5. 41 g. of 5-methyl - N - (p - chlorophenylsulfonyl) - 2 - pyrazoline-1-carboxamide are obtained. The melting point is 113–115° C. and the yield is 91.1%.

Example XXI

To a solution of 22 g. of p-chlorophenylsulfonylisocyanate in 500 ml. of chlorobenzene, 9 g. of 5-methyl-2-pyrazoline is added dropwise so that the temperature does not exceed 20° C., then the entire solution is slowly heated for 2 hours to a temperature of 80° C. which is maintained for 15 minutes. After cooling, the reaction mixture is subjected to triple extraction by means of a 1% aqueous ammonia solution, using each time 500 ml. of said solution.

The united extracts are decolorized by active carbon and then they are acidified with a 2% acetic acid solution to a pH value of 4.5. 23 g. of 5-methyl-N-(p-chlorophenylsulfonyl)-2-pyrazoline - 1 - carboxamide are obtained. The melting point is 113–115° C., and the yield is 69%.

Example XXII 70.4 g. of N-p-chlorophenylsulfonylurea and 38 g. of 3,5,5, - trimethyl - 2 - pyrazoline in 750 ml. of dioxane are heated to boiling. At a temperature of about 40° C. the N-p-chlorophenylsulfonylurea becomes dissolved, and then at a temperature of 75–80° C. its molecular connection with 3,5,5-trimethyl-2-pyrazoline (1:1) occurs, which upon further heating for two hours at the boiling temperature separates ammonia and becomes converted to 3,5,5 - trimethyl N-(p-chlorophenylsulfonyl) - 2 - pyrazoline-1-carboxamide. After separation, as described in Example XV, 83 g. of pure product are obtained. The melting point is 158–160° C. and the yield is 84%.

Example XXIII 117 g. of N - p - chlorophenylsulfonylurea and 71 g. of ethyl - 5 - n - propyl - 2 - pyrazoline in 800 ml. of dioxane are heated for 3 hours at the boiling temperature.

After separation as described in Example XI, 160 g. of 4 - ethyl - 5 - n - propyl - N - (chlorophenylsulfonyl)-2-pyrazoline - 1 - carboxamide are obtained. The melting point is 107.5–110° C. and the yield is 89.4%. The crystallization from 60% methanol (1:5) gives a pure product having a melting point of 109–110° C.

We claim:

1. A compound having hypoglycemic activity and of the formula:

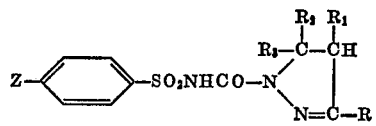

in which Z is hydrogen, halogen or lower alkyl, and R, $R_1$, $R_2$, $R_3$ each is hydrogen or lower alkyl.

2. A compound as claimed in claim 1 which is 5-methyl-N-(p-tolylsulfonyl)-2-pyrazoline-1-carboxamide.

References Cited

UNITED STATES PATENTS

| 3,198,706 | 8/1965 | Ruschig et al. | 260—553 D |
| 3,384,757 | 5/1968 | Ruschig et al. | 260—553 D |

FOREIGN PATENTS

| 1,157,599 | 11/1963 | Germany | 260—553 D |
| 863,451 | 3/1961 | Great Britain | 260—553 D |
| 896,303 | 5/1962 | Great Britain | 260—553 D |

OTHER REFERENCES

Holland et al.: J. Med. Chem., vol. 3, pp. 99–110 (1961).

Wiley et al.: Pyrazoles, Pyrazolines, Pyrazolidines, Indazoles and Condensed Rings, pp. 241–6, New York, Interscience—Wiley, 1967.

Chemical Abstracts, vol. 68, Subject Index (P–Z), pp. 3190S–3191S (1968).

NATALIE TROUSOF, Primary Examiner

U.S. Cl. X.R.

260—453 AR, 553 D, 553 DA; 424—273